US011287522B2

(12) United States Patent
Vazquez et al.

(10) Patent No.: US 11,287,522 B2
(45) Date of Patent: Mar. 29, 2022

(54) SINGLE SPACE OPTICAL PLATFORM FOR DETERMINING THE RANGE AND/OR VELOCITY OF SPACE OBJECTS

(71) Applicant: The Aerospace Corporation, El Segundo, CA (US)

(72) Inventors: George Vazquez, Woodland Park, CO (US); Christopher Bass, Colorado Springs, CO (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 605 days.

(21) Appl. No.: 16/161,232

(22) Filed: Oct. 16, 2018

(65) Prior Publication Data

US 2020/0116852 A1    Apr. 16, 2020

(51) Int. Cl.
| | | |
|---|---|---|
| *G01S 13/58* | (2006.01) |
| *G01S 7/40* | (2006.01) |
| *G01S 5/16* | (2006.01) |
| *G01S 11/12* | (2006.01) |
| *G01S 13/32* | (2006.01) |

(52) U.S. Cl.
CPC ............ *G01S 13/583* (2013.01); *G01S 5/16* (2013.01); *G01S 7/40* (2013.01); *G01S 11/12* (2013.01); *G01S 13/32* (2013.01)

(58) Field of Classification Search
CPC .......... G01S 13/583; G01S 7/40; G01S 13/32; G01S 17/003; G01S 5/16; G01S 11/12; G01S 5/10; G01S 5/11; G01S 5/12; G01S 5/014; G01S 5/015; G01S 5/016; G01S 5/017; G01S 5/019; G01S 11/06; G01S 11/10; G01S 17/50; G01S 17/06; G01S 17/66; G01S 17/58; B64G 3/00; B64G 1/242; B64G 1/10
See application file for complete search history.

(56) References Cited

U.S. PATENT DOCUMENTS

| | | | | |
|---|---|---|---|---|
| 2012/0274937 A1* | 11/2012 | Hays | ........................ | G01S 17/58 |
| | | | | 356/337 |
| 2017/0138851 A1* | 5/2017 | Ashrafi | ................ | G01N 33/487 |

OTHER PUBLICATIONS

X-ray pulsar/Doppler difference integrated navigation for deep space exploration with unstable solar spectrum by Jin Liu, Jian-Cheng Fang, Zhao-hua Yang, Zhi-wei Kang & Jin Wu (Year: 2015).*

(Continued)

*Primary Examiner* — Yoshihisa Ishizuka
*Assistant Examiner* — Carter W Ferrell
(74) *Attorney, Agent, or Firm* — LeonardPatel PC

(57) ABSTRACT

A single space platform with an optical telescope, a spectrometer, and/or a database of stored spectral information may be used to determine the range and/or velocity of natural or artificial resident space objects (RSOs). Relativistic Doppler shift measured from reflected solar photons and/or photons from other emitting source(s) provides information that the space platform can use to determine the relative velocity and the range rate. This information can then be used in combination with the right ascension and declination angles to perform differential correction and obtain an updated orbit.

37 Claims, 5 Drawing Sheets

(56) References Cited

OTHER PUBLICATIONS

University Physics (vol. 3) by Samuel J. Ling, William Moebs, & Jeff Sanny. (https://opentextbc.ca/universityphysicsv3openstax/chapter/doppler-effect-for-light/) (Year: 2016).*

Pantalone, Brett A., and Michael W. Kudenov. "Fraunhofer line optical correlator for improvement of initial orbit determination." Polarization Science and Remote Sensing VIII. vol. 10407. International Society for Optics and Photonics, 2017. (Year: 2017).*

Wikipedia contributors. "Relativistic Doppler effect." Wikipedia, The Free Encyclopedia. Wikipedia, The Free Encyclopedia, Oct. 17, 2017. Web. Aug. 31, 2021. (Year: 2017).*

Marie-Astrid A Cauquy, Michael C Roggemann, Timothy J Schulz, "Approaches for processing spectral measurements of reflected sunlight for space situational awareness," Proc. SPIE 5428, Signal and Data Processing of Small Targets 2004, (Aug. 25, 2004) (Year: 2004).*

Tang, Jing-shi et al. "Autonomous Orbit Determination for Spacecrafts Based on the Time-of-Arrival of Solar Radiation." (2015). (Year: 2015).*

Montenbruck, Oliver. "An epoch state filter for use with analytical orbit models of low earth satellites." Aerospace Science and Technology 4.4 (2000): 277-287. (Year: 2000).*

Laas-Bourez, Myrtilie, et al. "A robotic telescope network for space debris identification and tracking." Advances in Space Research 47.3 (2011): 402-410. (Year: 2011).*

Jin Liu et al., "X-ray pulsar/Doppler difference integrated navigation for deep space exploration with unstable solar spectrum," Aerospace Science and Technology 41, pp. 144-150 (2015).

Wikipedia Actinometer Article available at https://en.wikipedia.org/wiki/Actinometer (last accessed Jul. 24, 2018).

Wikipedia Pyranometer Article available at https://en.wikipedia.org/wiki/Pyranometer (last accessed Jul. 24, 2018).

* cited by examiner

RELATED ART

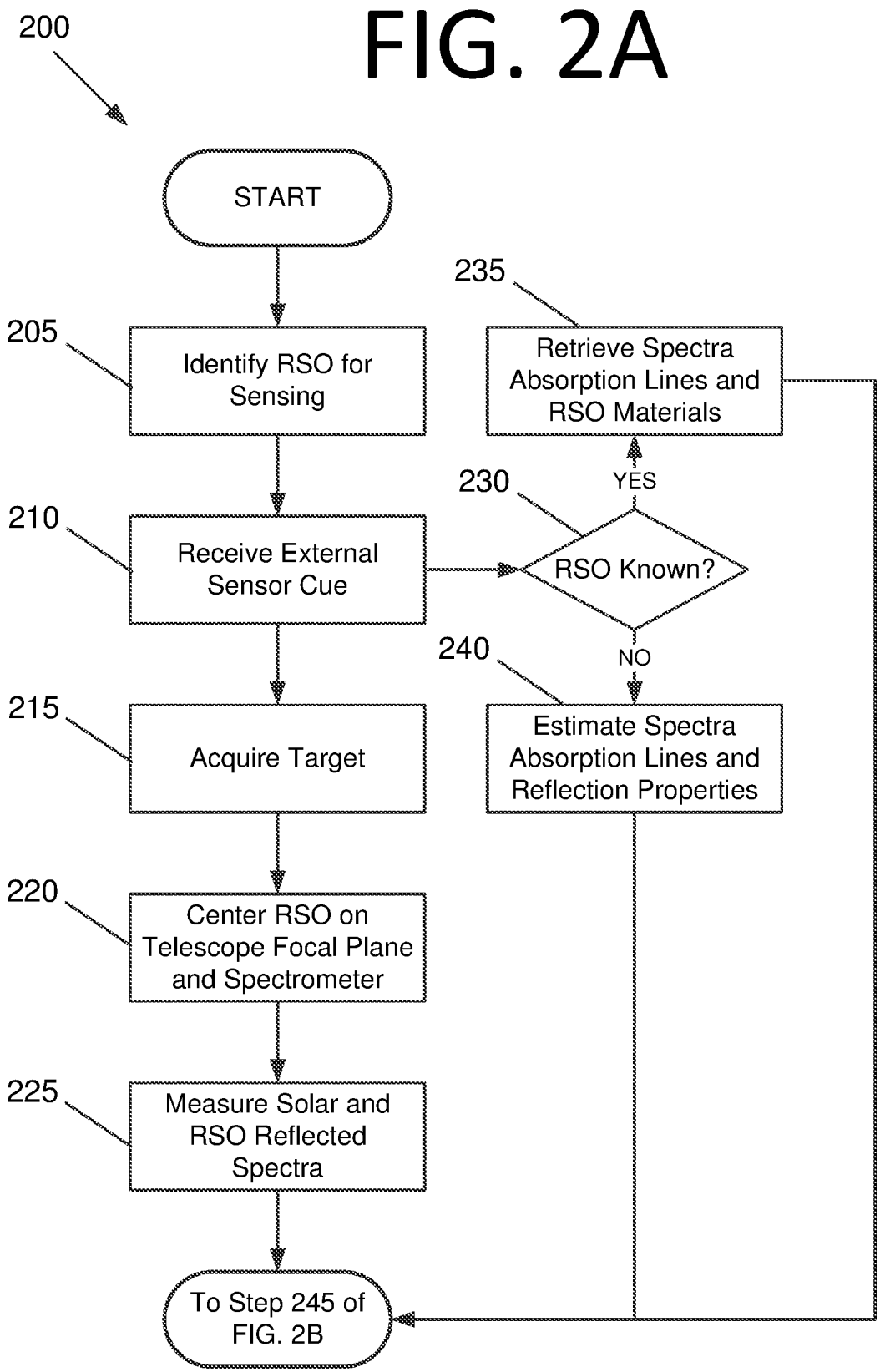

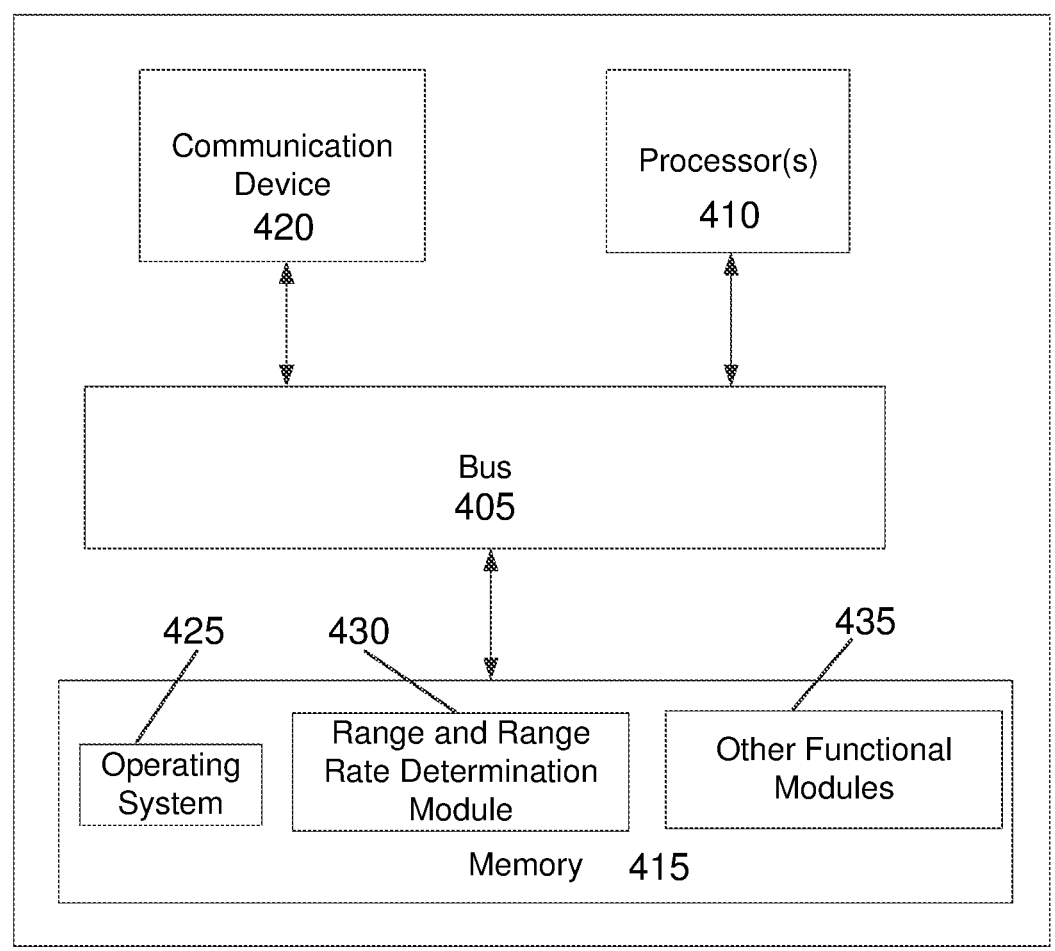

SINGLE SPACE OPTICAL PLATFORM FOR DETERMINING THE RANGE AND/OR VELOCITY OF SPACE OBJECTS

FIELD

The present invention generally pertains to object detection, and more particularly, to a single space optical platform for determining the range and/or velocity of space objects.

BACKGROUND

Space surveillance instruments fall into one of two categories—active or passive. An active sensor measures signals transmitted by the sensor that were reflected, refracted, or scattered by a natural or artificial resident space object (RSO). Active sensors may be used for determining range information. Passive sensors are instruments that receive and measure emissions or RSO reflected emissions produced by the sun or another illuminating source. Conventional passive sensors can produce angle information and pseudo-ranging information.

Currently, two or more optical systems with accurate and synchronized timing are required to track a single object to estimate range and velocity using parallax. Active techniques, such as radar, may also be used. However, these require power-consuming photon emissions and complex targeting and collecting techniques. Accordingly, an improved platform and approach to space object detection may be beneficial.

SUMMARY

Certain embodiments of the present invention may be implemented and provide solutions to the problems and needs in the art that have not yet been fully solved by conventional space object detection technologies. For example, some embodiments pertain to a single space optical platform configured to determine the range and/or velocity of a resident space object (RSO).

In an embodiment, a space optical platform configured to monitor RSOs includes an optical telescope configured to receive light from an RSO. The light includes sunlight that has been absorbed and emitted, reflected, or both, by the RSO. The space optical platform also includes a spectrometer that is configured to determine spectra of direct sunlight and a database storing known spectra for RSOs that have previously been observed. The space optical platform further includes a computing system in communication with the optical telescope, the spectrometer, and the database. The computing system is configured to measure spectra from the light from the RSO. The spectra include a set of absorption lines. The computing system is also configured to calculate a range rate of the RSO based on a relativistic Doppler shift in a frequency of the spectra of the light from the RSO. The relativistic Doppler shift is determined by comparing the set of absorption lines of the spectra of the RSO with a set of absorption lines from the spectra of the direct sunlight and calculating a difference between the sets of absorption lines.

In another embodiment, a space optical platform configured to monitor RSOs includes an optical telescope configured to receive light from an RSO. The light includes sunlight that has been absorbed and emitted, reflected, or both, by the RSO. The space optical platform also includes a spectrometer that is configured to determine spectra of direct sunlight and a database storing known spectra for RSOs that have previously been observed. The space optical platform further includes a computing system in communication with the optical telescope, the spectrometer, and the database. The computing system is configured to calculate a range of the RSO by calculating a time difference of arrival (TDOA) of directly measured solar illumination intensity fluctuations of solar lighting amplitude fluctuations extracted from a sun-staring sensor.

In yet another embodiment, A space optical platform includes an optical telescope configured to receive light from an RSO. The light includes sunlight having been absorbed and emitted, reflected, or both, by the RSO. The space optical platform also includes a database storing known spectra for RSOs that have previously been observed and a computing system in communication with the optical telescope and the database. The computing system is configured to retrieve the known spectra for the RSO from the database. The spectra include a set of absorption lines. The computing system is also configured to calculate a range rate of the RSO based on a relativistic Doppler shift in a frequency of spectra of light from the RSO. The relativistic Doppler shift is determined by comparing the set of absorption lines of the spectra of the RSO with a set of absorption lines from the spectra of the direct sunlight and calculating a difference between the sets of absorption lines.

In still another embodiment, a computing system includes memory storing computer program instructions and at least one processor communicably coupled to the memory and configured to execute the computer program instructions. The at least one processor is configured to calculate a range rate of an RSO based on a relativistic Doppler shift in a frequency of measured spectra of light from the RSO. The relativistic Doppler shift is determined by comparing a set of absorption lines of the measured spectra of the RSO with a set of absorption lines from spectra of direct sunlight and calculating a difference between the sets of absorption lines.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2A is a flowchart illustrating a first part of a process for determining the range and/or velocity of RSOs using a single space platform, according to an embodiment of the present invention.

FIG. 4 is a system diagram illustrating a computing system located on a single space platform that is configured to determine the range and/or velocity of RSOs, according to an embodiment of the present invention.

DETAILED DESCRIPTION OF THE EMBODIMENTS

Figure 1A:
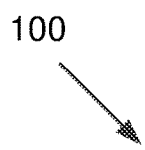
FIG. 1A is a schematic diagram illustrating two objects with geosynchronous Earth orbits (GEOs) traveling in opposite directions.
Figure 1A:
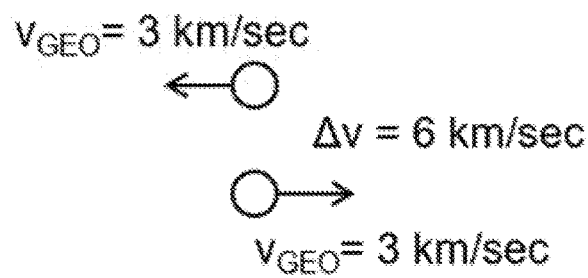

Some embodiments of the present invention pertain to a single space optical platform configured to determine the range and/or velocity of RSOs. As used herein, an RSO refers to a satellite, a rocket or rocket part, space debris, a spacecraft, a meteor, a comet, or any other object, whether natural or artificially created, that may be detected in the exosphere or space without deviating from the scope of the invention. A combination of a telescope and a spectrometer may be used to measure relativistic Doppler shift from reflected solar photons and/or one or more other illuminating sources, providing information that the platform can use to determine the relative velocity. However, if the spectra of the RSO are already known, a spectrometer alone may be used in some embodiments. Conventional processing techniques determine right ascension and declination angles and then perform differential correction to calculate an updated orbit. However, some embodiments of the present invention go further and determine the range rate. This information can then be used in combination with the right ascension and declination angles to perform differential correction and obtain an updated orbit.

Some embodiments determine the velocity of RSOs through the application of a series of space-based optical sensors housed in a single platform. The platform of some embodiments includes two sets of sensors—a telescope and a spectrometer. At least initially, the spectrometer is focused on the RSO to collect its spectra. Once the spectra for a particular RSO are known, the system of some embodiments can search a database of spectra for comparison.

The frequency of the light reflected from the space object is compared with a select set of emission and/or absorption lines from the spectrum of the direct sunlight, resulting in either an increase or decrease in the spectrum frequency (i.e., relativistic Doppler Shift). The emission and/or absorption lines and/or other feature(s) are selected from a precompiled database of common satellite materials in some embodiments, such as aluminum, boPET (biaxially-oriented polyethylene terephthalate—e.g., Mylar™), solar paneling, the system as a whole, etc. The spectral shift of the absorption lines and/or other spectra feature(s) feed the equations of motion for the relative motion between the RSO and the platform, resulting in a velocity measurement for the RSO.

There are characteristics that are preserved in sunlight and/or other photon source(s) reflected from the object that were originally present in the direct sunlight itself. It is possible through Raman scattering, for instance, to modify the reflected spectra of the RSO. However, the spectra lines and/or other spectra feature(s) that are used for comparison in some embodiments may be more complex than a simple relativistic Doppler shift. Portions of the solar spectrum that are reflected and not absorbed can also be used to reliably determine frequency shifts, and may be better characterized than RSO absorption lines.

An advantage of the telescope-based system of embodiments of the present invention over an active ranging system is that no active signals are required in the telescope-based system. Rather, the telescope and spectrometer passively detect light emitted by the sun and/or another illuminating source(s) that is reflected (or emitted) from an RSO and light emitted by the sun directly, respectively. Also, only a single telescope is required, whereas conventional approaches require at least two telescopes with sufficient separation distance to enable a parallax calculation.

Figure 1B:
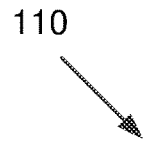
FIG. 1B is a schematic diagram illustrating a low Earth orbit (LEO) sensor tracking a GEO satellite.
Figure 1B:
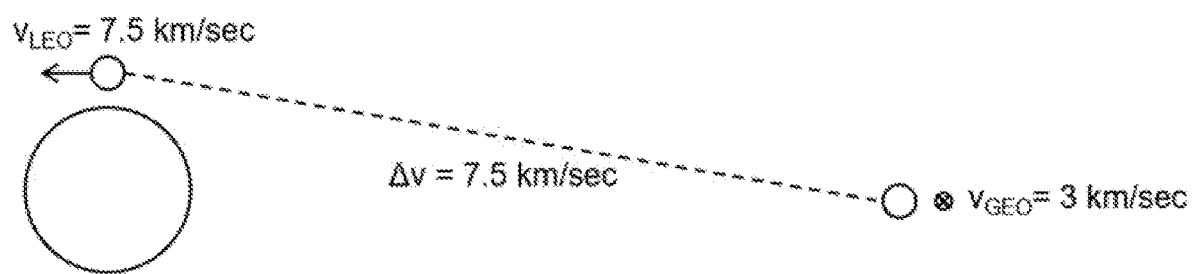

Rough calculations show a relativistic Doppler shift of approximately 0.002% for two satellites with geosynchronous Earth orbits (GEOs) traveling in opposite directions (see example 100 of FIG. 1A), or for a low Earth orbit (LEO) sensor tracking a GEO satellite (see example 110 of FIG. 1B). The relativistic Doppler frequency shift $\Delta f$ (which is a component of $\Delta v$ in the direction of the line of sight) is given by:

$$\Delta f = f_o \left( \frac{\sqrt{1 - \frac{\Delta v^2}{c^2}}}{1 \pm \frac{\Delta v}{c}} - 1 \right) \quad (1)$$

$$\frac{\Delta v}{c} = \frac{6 - 7.5 \text{ km/s}}{3 \times 10^5 \text{ km/s}} \approx 2 - 2.5 \times 10^5 \quad (2)$$

$$\frac{\Delta f}{f_o} \approx 0.002\% \quad (3)$$

where $f_o$ is the observed frequency of light from the RSO, $\Delta v$ is the difference in the velocity of the observer and the RSO being observed, and c is the speed of light in a vacuum.

FIG. 2A is a flowchart illustrating a first part of a process 200 for determining the range and/or velocity of RSOs using a single space platform, according to an embodiment of the present invention. The process begins with identifying an RSO for sensing at 205. An external sensor cue is then received at 210. The external sensor cue is calculated from a maintained RSO catalog containing position and velocity information in some embodiments. The RSO position is propagated to the observation time to estimate sensor look angles and cue the sensor.

At step 210, the process follows two branches. The left branch is a measurement subprocess that acquires the target at 215, centers and focuses the RSO on the telescope focal plane and on the spectrometer (e.g., a pyranometer) at 220, and measures solar and RSO reflected spectra (i.e., sunlight that has been absorbed and emitted, reflected, or both, by the RSO) at 225. However, it should be noted that if the RSO spectra were previously measured, the spectra may be retrieved from a database rather than measuring the spectra anew.

A pyranometer is a type of actinometer used for measuring solar irradiance on a planar surface. It is designed to measure the solar radiation flux density (W/m²) from the hemisphere above within a wavelength range 0.3 μm to 3 μm. An actinometer is an instrument that measures the heating power of radiation. More specifically, an actinometer is a chemical system or physical device that determines the number of photons in a beam integrally or per unit time. However, it should be noted that the spectra range may differ in other embodiments, depending on the instrument that is used. A pyranometer/actinometer is used herein as a non-limiting example of one class of such instruments.

The right branch determines whether the RSO is known or unknown at 230 by comparing the characteristics of the RSO to a database of known RSO characteristics. If the RSO is known at 230, the spectra absorption lines and RSO material characteristics are retrieved at 235. However, if the RSO is unknown at 230, the spectra absorption lines and reflection properties (e.g., material characteristics) of the RSO are estimated at 240.

Figure 2B:
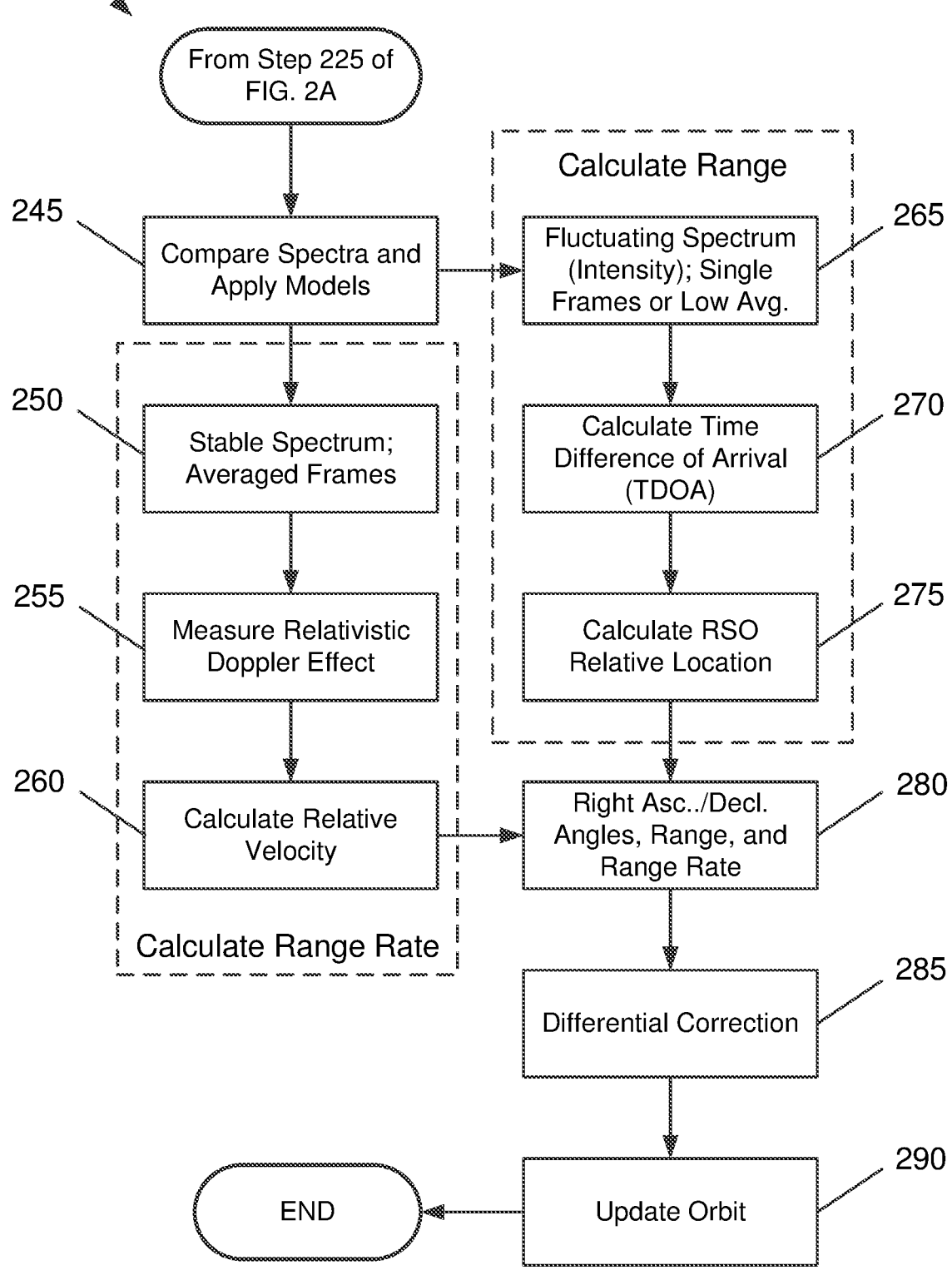
FIG. 2B is a flowchart illustrating a second part of the process for determining the range and/or velocity of RSOs using a single space platform, according to an embodiment of the present invention.

Once both branches in FIG. 2A are completed, the process proceeds to step 245 of FIG. 2B. More specifically, the spectra of the light from the RSO and the direct sunlight are compared at 245. If the object spectrum is known, the difference between absorption lines is calculated to obtain the frequency shift. If the object spectrum is unknown, the difference between solar emission lines is calculated to obtain the frequency shift.

At this point, the process branches into a range rate calculation subprocess (steps 250, 255, 260) and a range calculation subprocess (steps 265, 270, 275). Range rate is calculated by measuring frequency shifts, as described. Range is calculated using time difference of arrival (TDOA) of the intensity fluctuations in solar illumination. Instead of averaging over all image frames to get good spectral signal, fluctuations in solar illumination amplitude between individual frames or a small number of frames are used to build a reference signal from the sun and a shifted signal from the RSO for TDOA calculations. The image frames are two-dimensional projections of all light signals within the sensor field-of-view integrated over a short time (typically less than one second) in some embodiments.

Solar illumination amplitude fluctuations are measured directly by the sensor (i.e., the reference signal), and then amplitude fluctuations in the light reflected from the target are also measured (i.e., the shifted signal). By matching fluctuation patterns using cross-correlation techniques, TDOA is calculated and range is estimated by multiplying TDOA and the speed of light. Specific cross-correlation and measurement cadence parameters may require detailed analysis for optimal performance.

In the range rate (i.e., velocity) calculation subprocess, the reflected spectrum is averaged across all collected image frames (over time), and absorption and/or emission lines (and/or other spectra feature(s)) are compared with material absorption/emission values at 250. Absorption lines of the spectrum and emission will occur from direct RSO radiation. The path may require averaging to draw out the lines in the spectra due to noise.

With respect to "other spectra feature(s)", consider a theoretical blackbody (BB), where there are no emission or absorption lines. However, the BB peak (a spectra feature) can be used to calculate the blue or red shift using Wien's displacement law. Wien's displacement law states that the black body radiation curve for different temperature peaks at a wavelength is inversely proportional to the temperature.

The relativistic Doppler Effect is then measured at 255. In some embodiments, this may be calculated as $\Delta f/f_o$, as in Eq. (3). The relative velocity is then calculated by using the relativistic Doppler frequency shift from Eq. (1) at 260.

In the range calculation subprocess, solar lighting amplitude fluctuations are extracted from a sun-staring sensor at 265. The sun-staring sensor, which is part of the spectrometer in some embodiments, is separate from the primary sensors pointing towards the RSO, but is synchronized with the primary sensors to allow TDOA comparisons. The primary sensors are part of the optical telescope in some embodiments.

The spectrum fluctuates, so averaging over long periods of time may prevent comparison of the two spectra. RSO tracks with space-based optical sensors typically occur over 1-2 minutes in some embodiments, with several observations within a track. Observation image frames are collected after integrating (averaging) light signals for a fraction of a second in some embodiments. During each frame integration, total solar irradiance amplitude may be collected from direct solar measurements using the sun-staring sensor and from reflected light off the target RSO. The integrated signals may then be collected in a synchronized fashion to allow TDOA calculations.

The TDOA between direct and reflected light is then calculated at 270 using the directly measured solar irradiance fluctuations as a reference function for cross-correlation. From these calculations, the relative location of the RSO is calculated at 275 by multiplying the TDOA by the speed of light to calculate range and combining this value with standard right ascension and declination angular measurements.

Once the range rate and range have been calculated, the right ascension and right declination angles, the range, and the range rate are available at 280 as an output. The primary output of the platform in some embodiments is an observation that includes the time of observation in universal coordinated time (UCT), the RSO right ascension and declination angles relative to the sensors (and thus, to the platform) in radians, the range from the sensor to the RSO in kilometers, and the range rate of the RSO relative to the sensor in kilometers per second. However, any suitable types and standards of measurements may be used without deviating from the scope of the invention. The position of the sensor in Earth-fixed coordinates is also provided as part of the observation in some embodiments. These observations can then be used for differential correction and orbit updates at a data fusion center on the ground, or for processing on the space platform itself.

Differential correction is then performed at 285 by standard orbit determination techniques to calculate the orbit. The calculated orbit follows standard formats in some embodiments: (1) an orbital element set containing the epoch time and RSO orbital elements (e.g., inclination, eccentricity, right ascension of ascending node, argument of perigee, mean anomaly, and mean motion); or a state vector containing the epoch time and RSO position and velocity. The orbit is then updated at 290. Differential correction and orbit updates are generally accomplished at a multi-sensor data fusion center on the ground, but could be calculated on the space platform itself, if desired.

Figure 3:
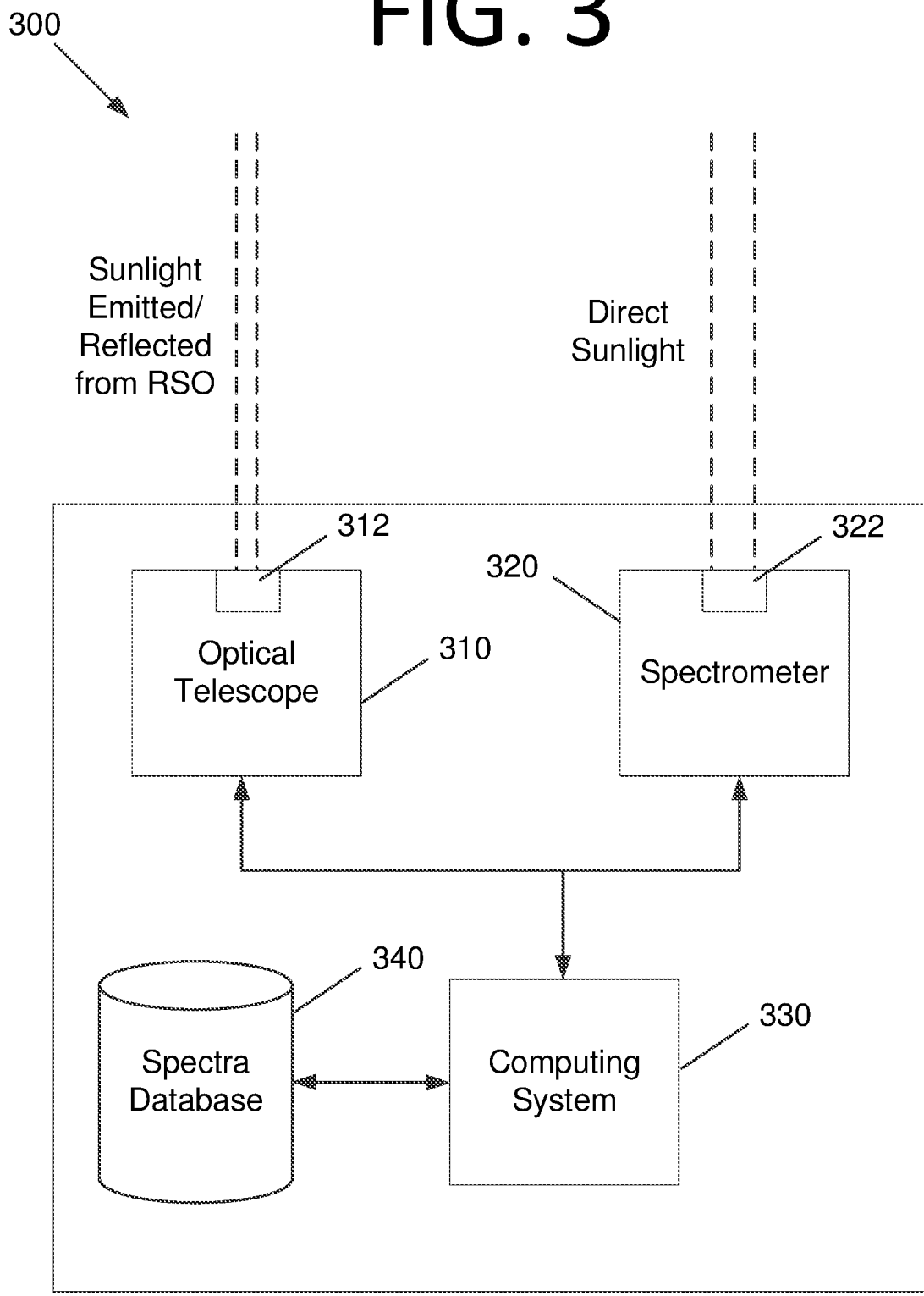
FIG. 3 is a system diagram illustrating a single space platform that is configured to determine the range and/or velocity of RSOs, according to an embodiment of the present invention.

FIG. 3 is a system diagram illustrating a single space platform 300 that is configured to determine the range and/or velocity of space objects, according to an embodiment of the present invention. Space platform 300 includes an optical telescope 310 and a spectrometer 320. Optical telescope 310 receives sunlight that has been absorbed and then emitted, and/or reflected, from an RSO. This light is then detected and analyzed by primary RSO-pointing sensors 312, which may be responsible for converting analog light into digital signals, detecting characteristics of the light, etc. Spectrometer 320 receives direct sunlight and includes a sun-staring sensor 322, which is synchronized with primary sensors 312 to allow TDOA comparisons. Optical telescope 310 and spectrometer 320 convert information from the light they detect to digital format (e.g., via photodetectors and/or another suitable mechanism), which is then provided to a computing system 330 (e.g., computing system 400 of FIG. 4). A database 340 that includes known spectra may be used for comparison in addition to, or in lieu of, light information from optical telescope 310. Computing system 330 uses the detected light information, or catalogued spectra information from database 340, to determine the range and velocity of the RSO, and to update its orbit.

FIG. 4 is a system diagram illustrating a computing system 400 located on a single space platform that is configured to determine the range and/or velocity of space objects, according to an embodiment of the present invention. Computing system 400 includes a bus 405 or other communication mechanism for communicating information, and processor(s) 410 coupled to bus 405 for processing information. In some embodiments, data may be sent to a ground system for processing.

Processor(s) 410, which may be onboard the space platform and/or on the ground, may be any type of general or specific purpose processor, including a central processing unit (CPU), a graphics processing unit (GPU), an application specific integrated circuit (ASIC), a field programmable gate array (FPGA), or any combination thereof. Processor(s) 410 can have multiple processing cores, and at least some of the cores may be configured to perform specific functions. Multi-parallel processing may be used in some embodiments. Computing system 400 further includes a memory 415 for storing information and instructions to be executed by processor(s) 410. Memory 415 can be comprised of any combination of random access memory (RAM), read only memory (ROM), flash memory, cache, static storage such as a magnetic or optical disk, or any other types of non-transitory computer-readable media or combinations thereof. Additionally, computing system 400 includes a communication device 420, such as a transceiver and antenna, to wirelessly provide access to a communications network.

Non-transitory computer-readable media may be any available media that can be accessed by processor(s) 410 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Memory 415 stores software modules that provide functionality when executed by processor(s) 410. The modules include an operating system 425 for computing system 400. The modules further include range and range rate determination module 430 that is configured to determining the range and/or velocity of an RSO by employing any of the approaches discussed herein or derivatives thereof. Computing system 400 may include one or more additional functional modules 435 that include additional functionality.

One skilled in the art will appreciate that a "system" could be embodied as a Field Programmable Gate Array (FPGA), an application specific integrated circuit (ASIC), an embedded microcontroller, a computer, a server, or any other suitable computing device, or combination of devices, without deviating from the scope of the invention. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 2A and 2B may be performed by a computer program, encoding instructions for at least one processor to perform at least the processes described in FIGS. 2A and 2B, in accordance with embodiments of the present invention. The computer program may be embodied on a non-transitory computer-readable medium. The computer-readable medium may be, but is not limited to, a hard disk drive, a flash device, RAM, a tape, or any other such medium used to store data. The computer program may include encoded instructions for controlling the at least one processor to implement the processes described in FIGS. 2A and 2B, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general-purpose computer, or an ASIC.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A space optical platform configured to monitor resident space objects (RSOs), comprising:
   an optical telescope configured to receive light from an RSO, the light comprising sunlight having been absorbed and emitted, reflected, or both, by the RSO;
   a spectrometer comprising a sun-staring sensor, the spectrometer configured to determine spectra of direct sunlight;
   a database storing known spectra for RSOs that have previously been observed; and
   a computing system in communication with the optical telescope, the spectrometer, and the database, the computing system configured to:
   measure spectra from the light from the RSO, the spectra comprising a set of absorption lines;
   calculate a range rate of the RSO based on a relativistic Doppler shift in a frequency of the spectra of the light from the RSO, the relativistic Doppler shift determined by comparing the set of absorption lines of the spectra of the RSO with a set of absorption lines from the spectra of the direct sunlight and calculating a difference between the sets of absorption lines;
   from solar illumination intensity fluctuations, build a reference signal from the sun and a shifted signal from the RSO, wherein the reference signal comprises solar illumination intensity fluctuations measured directly by a sun-staring sensor and the shifted signal comprises amplitude fluctuations in sunlight reflected by the RSO; and
   calculate a range of the RSO by calculating a time difference of arrival (TDOA) of directly measured solar illumination intensity fluctuations of solar lighting amplitude fluctuations extracted from a sun-staring sensor based upon the reference signal and the shifted signal.

2. The space optical platform of claim 1, wherein the computing system is further configured to compare the set of absorption lines from the spectra of the RSO with a database of spectra from known materials and/or systems.

3. The space optical platform of claim 1, wherein the computing system is further configured to identify the RSO for sensing.

4. The space optical platform of claim 1, wherein the computing system is further configured to receive an external cue calculated from a maintained RSO catalog comprising position and velocity information, the RSO position propagated to an observation time to estimate sensor look angles and cue the sensor.

5. The space optical platform of claim 1, wherein the computing system is further configured to:
   determine whether spectra for the RSO were previously measured by comparing the spectra of the RSO to known RSO spectra in the database;
   when the spectra for the RSO were previously measured, retrieve the spectra absorption lines and material characteristics for the RSO; and
   when the spectra for the RSO were not previously measured, estimate the spectra absorption lines and material characteristics of the RSO.

6. The space optical platform of claim 1, wherein the computing system is further configured to perform a measurement subprocess, comprising:
   acquiring the RSO; and
   centering and focusing the RSO on a focal plane of the optical telescope and on the spectrometer.

7. The space optical platform of claim 1, wherein the determining of the range rate by the computing system further comprises:
   averaging a reflected spectrum across a plurality of collected image frames and comparing the set of absorption lines of the spectra of the RSO with material absorption values in the database.

8. The space optical platform of claim 7, wherein the image frames are two-dimensional projections of all light signals within a sensor field-of-view integrated over a period of time.

9. The space optical platform of claim 8, wherein the period of time is less than one second.

10. The space optical platform of claim 1, wherein the relativistic Doppler effect $\Delta f$ is calculated by:

$$\Delta f = f_o \left( \frac{\sqrt{1 - \frac{\Delta v^2}{c^2}}}{1 \pm \frac{\Delta v}{c}} - 1 \right)$$

where $f_o$ is an observed frequency of light from the RSO, $\Delta v$ is a difference in a velocity of the space optical platform and the RSO, and c is the speed of light, and the range rate is determined by $\Delta f/f_o$.

11. The space optical platform of claim 1, wherein the computing system is further configured to:

calculate a relative location of the RSO by multiplying the TDOA by the speed of light to obtain a range and combining the obtained range with right ascension and declination angular measurements of the RSO; and output an observation.

12. The space optical platform of claim 11, wherein the observation comprises a time of observation, the right ascension and declination angles of the RSO relative to the space optical platform, the range from the space optical platform to the RSO, the range rate of the RSO relative to the space optical platform, and a position of the space optical platform in Earth-fixed coordinates.

13. The space optical platform of claim 12, wherein the computing system is further configured to:
perform differential correction and an orbit update based on the observation.

14. The space optical platform of claim 1, wherein the computing system is further configured to:
update an orbit of the RSO based on the calculated range, the calculated range rate, a right ascension angle, and a right declination angle.

15. The space optical platform of claim 14, wherein the orbit comprises an orbital element set comprising an epoch time, an inclination, an eccentricity, a right ascension of an ascending node, an argument of perigee, a mean anomaly, and a mean motion.

16. The space optical platform of claim 14, wherein the orbit comprises a state vector comprising an epoch time, an RSO position, and an RSO velocity.

17. A space optical platform configured to monitor resident space objects (RSOs), comprising:
an optical telescope comprising primary sensors, the optical telescope configured to receive light from an RSO, the light comprising sunlight having been absorbed and emitted, having been reflected, or both, by the RSO;
a spectrometer comprising a sun-staring sensor, the spectrometer configured to determine spectra of direct sunlight;
a database storing known spectra for RSOs that have previously been observed; and
a computing system in communication with the optical telescope, the spectrometer, and the database, the computing system configured to:
from solar illumination intensity fluctuations, build a reference signal from the sun and a shifted signal from the RSO, wherein the reference signal comprises solar illumination intensity fluctuations measured directly by a sun-staring sensor and the shifted signal comprises amplitude fluctuations in sunlight reflected by the RSO; and
calculate a range of the RSO by calculating a time difference of arrival (TDOA) of directly measured solar illumination intensity fluctuations of solar lighting amplitude fluctuations extracted from a sun-staring sensor.

18. The space optical platform of claim 17, wherein the computing system is further configured to perform a measurement subprocess, comprising:
acquiring the RSO; and
centering and focusing the RSO on a focal plane of the optical telescope and on the spectrometer.

19. The space optical platform of claim 17, wherein the computing system is further configured to:
calculate a relative location of the RSO by multiplying the TDOA by the speed of light to obtain a range and combining the obtained range with right ascension and declination angular measurements of the RSO; and output an observation.

20. The space optical platform of claim 19, wherein the observation comprises a time of observation, the right ascension and declination angles of the RSO relative to the space optical platform, the range from the space optical platform to the RSO, a range rate of the RSO relative to the space optical platform, and a position of the space optical platform in Earth-fixed coordinates.

21. The space optical platform of claim 19, wherein the computing system is further configured to:
perform differential correction and an orbit update based on the observation.

22. The space optical platform of claim 17, wherein the computing system is further configured to:
update an orbit of the RSO based on the calculated range, a right ascension angle, and a right declination angle.

23. The space optical platform of claim 22, wherein the orbit comprises an orbital element set comprising an epoch time, an inclination, an eccentricity, a right ascension of an ascending node, an argument of perigee, a mean anomaly, and a mean motion.

24. The space optical platform of claim 22, wherein the orbit comprises a state vector comprising an epoch time, an RSO position, and an RSO velocity.

25. A space optical platform, comprising:
an optical telescope configured to receive light from a resident space object (RSO), the light comprising sunlight having been absorbed and emitted, reflected, or both, by the RSO;
a database storing known spectra for RSOs that have previously been observed; and
a computing system in communication with the optical telescope and the database, the computing system configured to:
retrieve the known spectra for the RSO from the database, the spectra comprising a set of absorption lines;
from solar illumination intensity fluctuations, build a reference signal from the sun and a shifted signal from the RSO, wherein the reference signal comprises solar illumination intensity fluctuations measured directly by a sun-staring sensor and the shifted signal comprises amplitude fluctuations in sunlight reflected by the RSO;
calculate a range of the RSO by calculating a time difference of arrival (TDOA) of directly measured solar illumination intensity fluctuations of solar lighting amplitude fluctuations extracted from a sun-staring sensor; and
calculate a range rate of the RSO based on a relativistic Doppler shift in a frequency of spectra of light from the RSO, the relativistic Doppler shift determined by comparing the set of absorption lines of the spectra of the RSO with a set of absorption lines from the spectra of the direct sunlight and calculating a difference between the sets of absorption lines.

26. The space optical platform of claim 25, wherein the computing system is further configured to perform a measurement subprocess, comprising:
acquiring the RSO; and
centering and focusing the RSO on a focal plane of the optical telescope and on the spectrometer.

27. The space optical platform of claim 25, wherein the determining of the range rate by the computing system further comprises:

averaging a reflected spectrum across a plurality of collected image frames and comparing the set of absorption lines of the spectra of the RSO with material absorption values in the database, wherein
the image frames are two-dimensional projections of all light signals within a sensor field-of-view integrated over a period of time of less than one second.

28. The space optical platform of claim 25, wherein the computing system is further configured to:
calculate a relative location of the RSO by multiplying the TDOA by the speed of light to obtain a range and combining the obtained range with right ascension and declination angular measurements of the RSO; and
output an observation comprising a time of observation, the right ascension and declination angles of the RSO relative to the space optical platform, the range from the space optical platform to the RSO, the range rate of the RSO relative to the space optical platform, and a position of the space optical platform in Earth-fixed coordinates.

29. The space optical platform of claim 28, wherein the computing system is further configured to:
perform differential correction and an orbit update based on the observation.

30. The space optical platform of claim 25, wherein the computing system is further configured to:
update an orbit of the RSO based on the calculated range rate, a right ascension angle, and a right declination angle.

31. A computing system, comprising:
memory storing computer program instructions; and
at least one processor communicably coupled to the memory and configured to execute the computer program instructions, the at least one processor configured to:
from received solar illumination intensity fluctuations, build a reference signal from the sun and a shifted signal from the RSO, wherein the reference signal comprises solar illumination intensity fluctuations measured directly by a sun-staring sensor and the shifted signal comprises amplitude fluctuations in sunlight reflected by the RSO;
calculate a range of the RSO by calculating a time difference of arrival (TDOA) of directly measured solar illumination intensity fluctuations of solar lighting amplitude fluctuations extracted from a sun-staring sensor;
calculate a range rate of a resident space object (RSO) based on a relativistic Doppler shift in a frequency of measured spectra of light from the RSO, the relativistic Doppler shift determined by:
comparing a set of absorption lines of the measured spectra of the RSO with a set of absorption lines from spectra of direct sunlight, and
calculating a difference between the sets of absorption lines.

32. The computing system of claim 31, wherein the determining of the range rate further comprises:
averaging a reflected spectrum across a plurality of collected image frames and comparing the set of absorption lines of the spectra of the RSO with material absorption values in the database, wherein
the image frames are two-dimensional projections of all light signals within a sensor field-of-view integrated over a period of time of less than one second.

33. The computing system of claim 31, wherein the relativistic Doppler effect $\Delta f$ is calculated by:

$$\Delta f = f_o \left( \frac{\sqrt{1 - \frac{\Delta v^2}{c^2}}}{1 \pm \frac{\Delta v}{c}} - 1 \right)$$

where $f_o$ is an observed frequency of light from the RSO, $\Delta v$ is a difference in a velocity of the space optical platform and the RSO, and c is the speed of light, and the range rate is determined by $\Delta f/f_o$.

34. The computing system of claim 31, wherein the at least one processor is further configured to:
calculate a relative location of the RSO by multiplying the TDOA by the speed of light to obtain a range and combining the obtained range with right ascension and declination angular measurements of the RSO; and
output an observation comprising a time of observation, the right ascension and declination angles of the RSO relative to the space optical platform, the range from the space optical platform to the RSO, the range rate of the RSO relative to the space optical platform, and a position of the space optical platform in Earth-fixed coordinates.

35. The computing system of claim 34, wherein the at least one processor is further configured to:
perform differential correction and an orbit update based on the observation.

36. The computing system of claim 31, wherein the at least one processor is further configured to:
update an orbit of the RSO based on the calculated range, the calculated range rate, a right ascension angle, and a right declination angle.

37. The computing system of claim 36, wherein the orbit comprises:
an orbital element set comprising an epoch time, an inclination, an eccentricity, a right ascension of an ascending node, an argument of perigee, a mean anomaly, and a mean motion; or
a state vector comprising an epoch time, an RSO position, and an RSO velocity.

* * * * *